March 26, 1929.  O. J. MERRILL  1,706,582
MEASURING CUP
Filed Aug. 18, 1927
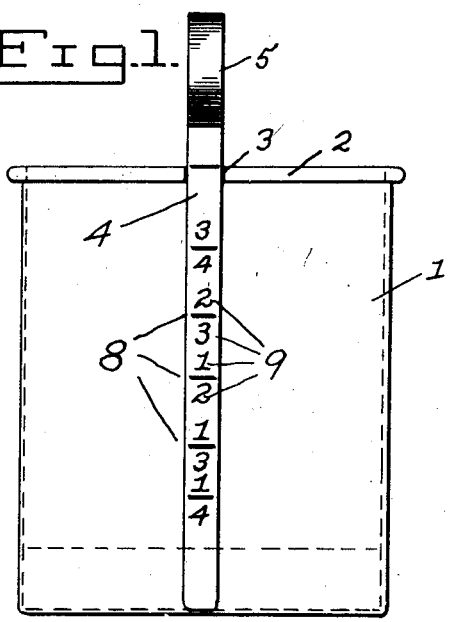
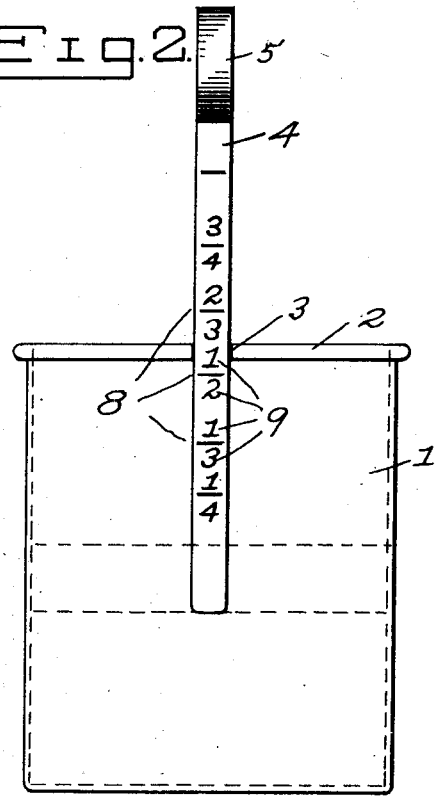
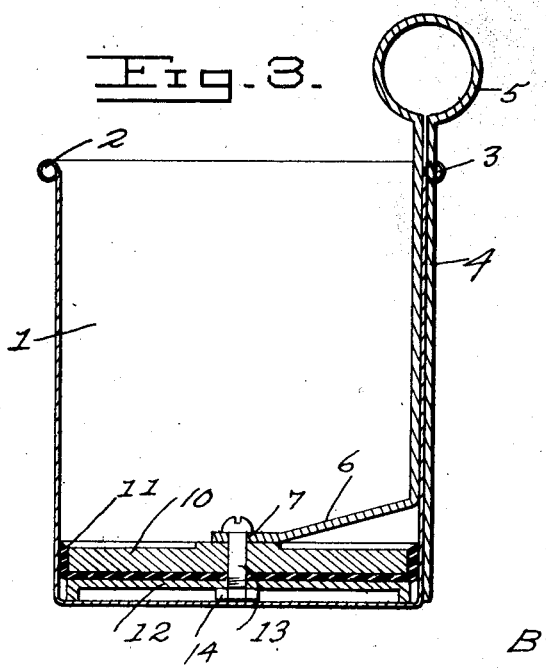
INVENTOR.
OLIVER J. MERRILL.
BY Henry Molz
ATTORNEY.

Patented Mar. 26, 1929.

1,706,582

UNITED STATES PATENT OFFICE.

OLIVER J. MERRILL, OF GLENDALE, CALIFORNIA.

MEASURING CUP.

Application filed August 18, 1927. Serial No. 213,839.

My invention relates to improvements in measuring cups in which a vertically movable piston operates to decrease the gross content of the vessel in conformity with a series of capacity markers provided on a regulating handle carrying said piston and coinciding with the content capacity of the vessel.

The principal object of my invention is to provide a simple fool proof and readily manipulated device for accurately measuring food ingredients.

I attain these objects by the mechanism illustrated in the accompanying drawing, in which:—

Figure 1 is a front view of my measuring cup; Fig. 2, a similar view showing the capacity regulating handle and piston raised from the bottom of the vessel; and Fig. 3, is a sectional view taken at right angles to Fig. 1.

Similar numerals refer to similar parts throughout the several views.

The vessel 1, has a rolled edge rim 2 at its mouth, said rim being slotted as at 3, said slot functioning to guide a capacity regulating handle 4 positioned therein to eliminate side sway, said handle comprising two spring tensioned members, one of which extends into the vessel and engages the interior surface thereof, the other being positioned in the slot 3 and engaging the exterior surface of the vessel wall, both of said members extending downwardly from a formed ring 5 of which they form an integral part.

Offset as at 6, the interior handle member has an aperture 7 therethrough, marks 8 on the exterior handle member represent the known vessel capacity with said handle raised to the vessel's height in line with any one of the said marks, and 9 indicates the gross capacity content each of said marks denote.

A disk shaped piston comprising a body member 10, a cup member 11 and a retaining member 12 is attached to the interior handle member by means of a bolt 13 passing through the apperture 7, and is prevented from disengaging therefrom by means of a nut 14.

It will readily be understood that raising the handle 4 will draw up with it the piston which forms a false bottom in the vessel at any given point as indicated by the mark engraved on the capacity regulating member of the handle 4. While the said piston is movable and readily raised or lowered at will, it must be understood that by reason of the cup member 11 and the resultant vacuum created thereby, none of the vessel's contents can flow below the piston upon which it normally rests.

As a practical article of manufacture, the vessel itself can be manufactured from any desired material as metal, glass, porcelain or other suitable substance, and with or without a carrying handle, while the regulating handle is best manufactured out of spring steel or brass nickle plated.

While I have illustrated for the sake of simplicity, a vessel of relative small capacity, the principle of my invention is equally suitable for larger and even smaller vessels, and I am also aware that slight modifications may from time to time be made in the details of construction without departing, however, from the scope of the present invention as herein set forth, and as defined in the claim which is appended hereto. Hence, I do not limit my present invention to the exact description or construction herein disclosed, but what I do claim, is:—

A device of the class described, embodying a vessel, a self tensioning regulating handle member slidably operative within the said vessel and without the same, said vessel having a permanent closed bottom and an open top, a cylindrical disk plate attached to said regulating handle member and having a cup member and a retaining member connected therewith to comprise a cylindrical formed piston element, and said cylindrical piston element being movably operative within the said vessel and forming a vacuum with the inner vessel wall.

OLIVER J. MERRILL.